Figure 1:
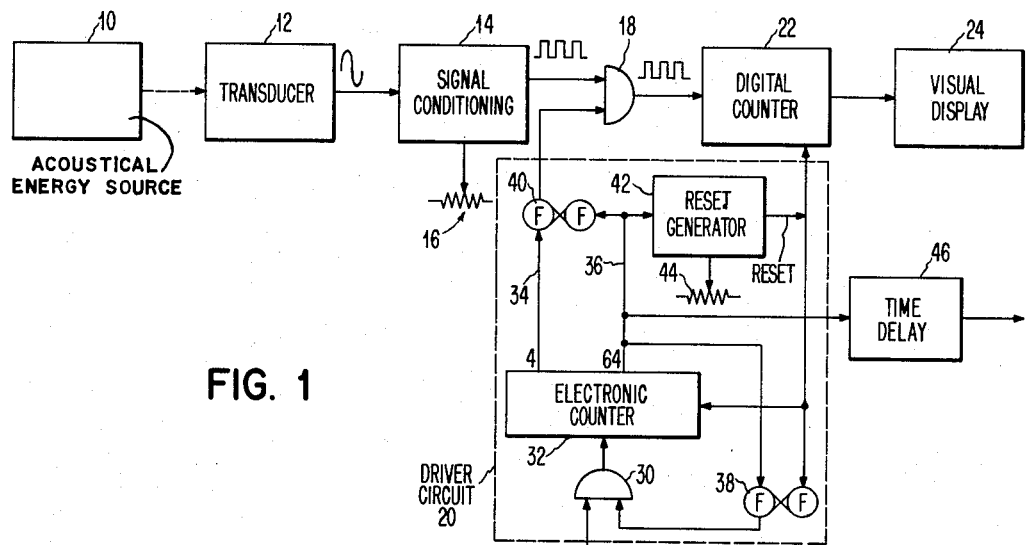

Aug. 18, 1964  L. P. FABER, JR., ETAL  3,144,802
TUNING APPARATUS

Filed June 1, 1961  2 Sheets-Sheet 1

INVENTOR.
LAWRENCE P. FABER Jr
KEITH S. KIRKWOOD
BY
Clay Holland, Jr.

ATTORNEY

Aug. 18, 1964   L. P. FABER, JR., ETAL   3,144,802
TUNING APPARATUS
Filed June 1, 1961   2 Sheets-Sheet 2

INVENTOR.
LAWRENCE P. FABER JR
KEITH S. KIRKWOOD
BY
Clay Holland, Jr.
ATTORNEY

United States Patent Office 3,144,802
Patented Aug. 18, 1964

3,144,802
TUNING APPARATUS
Lawrence P. Faber, Jr., 3127 David Ave., Palo Alto, Calif., and Keith S. Kirkwood, 10633 S. Blane Ave., Cupertino, Calif.
Filed June 1, 1961, Ser. No. 114,163
9 Claims. (Cl. 84—454)

This invention relates to an electronic apparatus for measuring the frequency of acoustical energy and more particularly to a solid state device electronic apparatus for measuring the frequency of acoustical energy whereby the acoustical energy is converted into an electrical signal having a frequency corresponding to that of the acoustical energy and apparatus for recording the same.

Prior to the advent of electronic apparatus, pianos and other instruments were tuned by an artisan who listened concurrently to the pitch of a tuning fork vibrating at a frequency corresponding to a key note and to the pitch of the corresponding piano string. Tuning of pianos and other instruments by this practice requires a highly trained human ear and is very time consuming. In addition, such practices are not amenable to automation.

With the advent of electronic apparatus, many forms of electronic tuning devices for pianos and other instruments have been proposed to obviate the disadvantages of the aforementioned practices. One such electronic apparatus proposes comparing a known frequency standard, such as the output frequency of a crystal oscillator, with the frequency of the note being measured. The reference frequency signal provides a sine wave image on a cathode ray screen, the cathode ray tube being a part of the apparatus, the reference signal having a predetermined horizontal sweep rate. In theory, if the note being tuned is flat, the image on the screen will appear to be running to the left and when the instrument being tuned is sharp, the image will appear to be running to the right. Thus, in theory, when the image is stationary, the note is presumed to be in tune. It has been found in practice that the operator cannot accurately determine the degree of flatness or sharpness of a note when viewed on the cathode ray tube screen. This is so because there is no simple way to indicate by the speed of travel of the sweep of the sine wave, how close or how far away from a flat or sharp the measured signal is. Thus the operator using such a tuning device must have sufficient skill and knowledge in the use of an oscilloscope to know when the note being tested is approximately flat, sharp, or in tune, since the visual display of tuning process is not a direct reading of the frequency. One of the most striking disadvantages of such a system is the inaccuracy in the measurement which arises from errors of the operator in reading and interpreting the information shown on the oscilloscope employed with the apparatus. Since the operator is unable to determine from the rate of speed at which the sine wave sweeps across the cathode ray tube screen the exact frequency of the note measured, he must always guess and he can never be absolutely sure of his guess. In addition, the size of the oscilloscope, if it is a small sized one, may increase the possibility for additional error. Another disadvantage arises from the fact that relatively elaborate frequency dividing circuitry is required to provide a frequency standard which is capable of selecting each frequency that is desired to be measured. Thus the accuracy of the measurements is dependent upon the accuracy of the dividing circuitry and the ability of the operator to read and interpret the information displayed on the oscilloscope.

Another form of apparatus proposed heretofore is the so-called "stroboscope" arrangement, wherein the purpose of the device is to measure the difference in frequency between two simultaneously sounded tones. In operation the received signals excite one or more stroboscope illumination lamps at a rate equal to two times the said frequency difference. A principal disadvantage of this apparatus arises from the fact that there is the possibility that the operator will make errors in his observations and interpretations of the information present on the stroboscope disc. Thus one unfamiliar with the use of the stroboscopic disc is likely to find the tuning process somewhat more inaccurate and difficult than is desired. In addition, the readings from the disc are not direct frequency readings. The stroboscope disc has a plurality of concentric bands which represent the frequencies measured by the device. A serious disadvantage arises in using the disc because it is possible for the disc to show two different frequencies, that is the frequency which may be a harmonic of the frequency of the note being tuned. The operator is required to have some skill and knowledge of music, in the instance of the piano, so that he will know what note and frequency he is tuning for. Thus this device is extremely limited in its usefulness, since a skilled musician is needed.

Still another disadvantage of the stroboscopic disc device arises from the fact that the lamps, which may be small low power neon lamps or other lamps which operate by ionization of a gas, do not stay lighted long enough nor do they have a high enough light level when lighted at the lower frequencies to enable the operator to accurately read the stroboscopic disc. At the higher frequency the usefulness of the device is lessened by the fact that the illumination or neon lamps employed in the apparatus are substantially incapable of responding, that is switching on and off, fast enough to provide an accurate count of the frequency of the device being tuned.

Thus it can be readily appreciated by those versed in the frequency measuring art that one could not expect to get very accurate measurements with the aforementioned prior art devices. More particularly, one could not expect to measure the frequency of a note within one or two cycles at either the high or low frequencies.

The present invention overcomes the foregoing and other problems associated with the prior art manual and electronic devices for measuring the frequency of acoustical noice. In accordance with one concept of the invention there is provided a transistorized apparatus for measuring and recording in numerical form the sound vibrations of acoustical noise which has been converted to electrical impulses by any suitable transducer used for that purpose. This apparatus displays the exact frequency of the acoustical energy and the operator always knows precisely where he is after each measurement.

More particularly, according to the invention, acoustical energy is received by a transducer, such as a microphone or crystal pick-up for examples, and converted to an electrical output signal, such as a sine wave, having a frequency exactly to the frequency of the sound vibrations. The electrical signal from the transducer is fed into signal conditioning circuit which may include an amplifier, a pulse shaper and a threshold control, or a Schmitt trigger circuit. The output of the signal conditioning circuit may be a train of pulses whose pulse repetition rate is equal to the frequency of sound vibration which is fed into an "and" gating logic, which is held open for a specified time by a control gating signal from a timing control circuit. The pulse trains which pass through the gate during the counting cycle are counted and recorded by a counting system and may be displayed visually by an associated display system. In tuning pianos and other devices in accordance with the present invention, the frequency of the note being tuned may be presented on an accompanying reference display for ready reference and the operator is only required to adjust the tension of the string or other tuning mechanisms so that the number of pulses counted corresponds to the number representing the desired frequency shown on the reference display. The reference display may be a part to the measuring apparatus or a separate unit. The reference display may include the facilities for establishing a range defined by an upper and lower frequency limit as opposed to a single frequency as the reference. With a capability of this type the operator can set the limits as close to the desired frequency as he likes, being limited only by his own physical capabilities in making the adjustment.

According to another illustrative embodiment of the invention, there is provided an apparatus for automatically measuring and comparing successively the frequency of a plurality of acoustical energy sources, such as organ pipes for example, with preselected frequency limits for each organ pipe. This embodiment of the invention includes components similar to the embodiment discussed hereinabove, while it also includes additional circuitry for selecting the specific organ pipe to be tuned, exciting the pipe and measuring and comparing the frequency of the noise generated by the pipes. The resulting frequency measurement is compared with a preselected reference number. If the two frequencies do not compare favorably the system automatically adjusts, energizes, converts and compares at the adjusted point. This cycling process may continue for several times until the desired tune is obtained. The device automatically advances to the next organ pipe if the measured frequency substantially matches that of the reference standard.

It is therefore an object of the present invention to provide an improved electronic apparatus for measuring frequency of acoustical energy.

Another object of this invention is to provide an electronic apparatus which is capable of measuring and recording the precise frequency of acoustical energy and displaying the same visually.

Still another object of this invention is to provide an electronic apparatus for automatically exciting a plurality of acoustical energy sources in turn according to a preselected pattern and comparing the frequencies thereof with a reference standard and repeating the cycle until the measured frequencies match that of the reference standard.

Yet another object of the invention is to provide an electronic apparatus which is operable by a person of minimum technical skill and training, and by which the frequency measured may be read directly and exactly from a numerical display.

A further object of the invention is to provide a tuning apparatus which may be designed using all solid state devices so that it is light in weight and small in size.

The novel features which are believed to be characteristic of the invention, both as to organization and method of operation, together with further objects and advantages thereof, will be better understood from the following description considered in connection with the accompanying drawings in which several embodiments of the invention are illustrated by way of example. It is expressly understood, however, that the drawings are for the purpose of illustration and description only, and are not intended as a definition of the limits of the invention.

Figure 2:
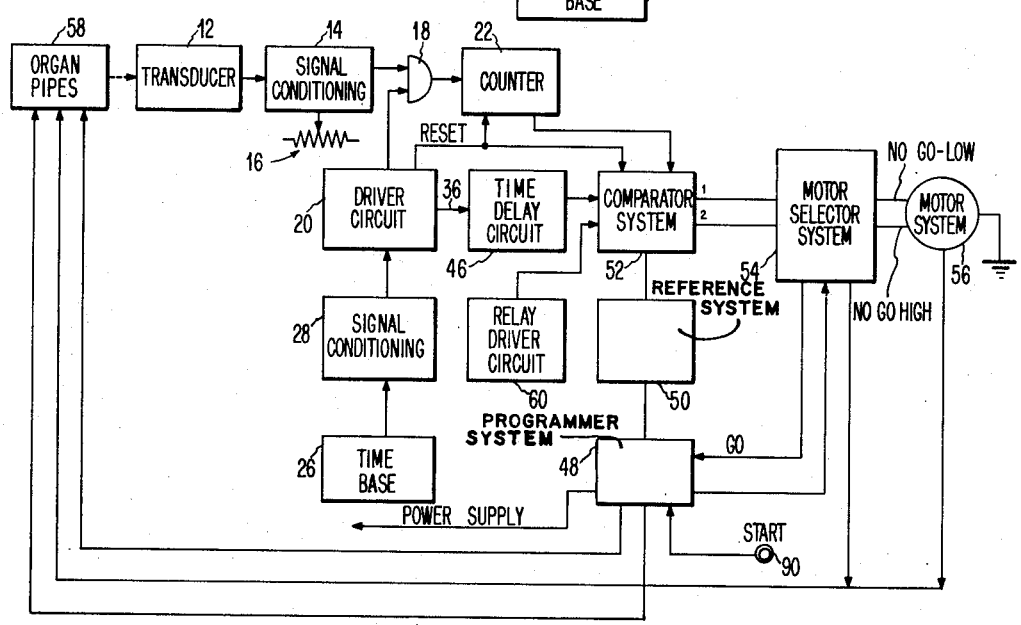
Figure 3:
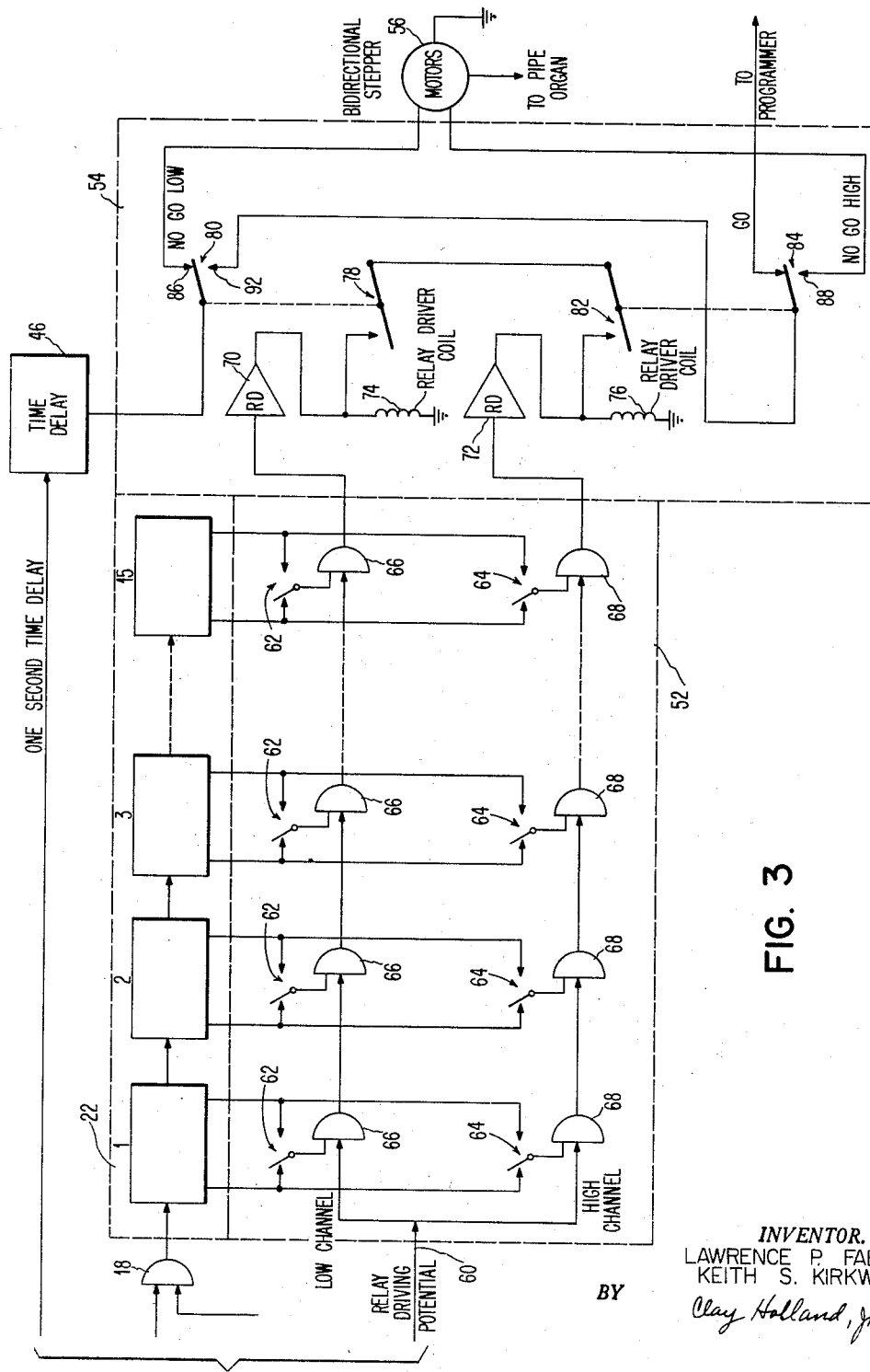

FIGURE 1 is a block diagram showing an arrangement of electronic circuits and associated devices illustrating one form of electronic apparatus for measuring the frequency of acoustical energy in accordance with the invention;

FIGURE 2 is a block diagram showing an arrangement of electronic circuits and associated devices illustrating one form of automatic electronic apparatus for tuning a plurality of acoustical energy sources in accordance with the invention; and FIGURE 3 is a part schematic and part block drawing showing several typical automation circuits of FIGURE 2, illustrating the manner in which these circuits cooperate in accordance with the invention.

Referring now to the drawings, wherein the same reference characters designate like or corresponding parts or circuits throughout the several views, there is shown in FIGURE 1 an arrangement of circuitry utilized in one illustrative embodiment of the invention. Since several of the circuits illustrated in FIGURE 1 may be composed of elements of standard types commercially available, no detailed schematic diagrams are necessary for certain circuits. A description of the functions and the manner in which the various circuits cooperate will be discussed in detail hereinafter.

As shown in FIGURE 1 an acoustical energy source 10 is capable of producing acoustical energy which it thereafter transmits to a suitable transducer 12. For purposes of discussing this embodiment of the invention transducer 12 may be a microphone when only one instrument is being tuned. If it is desirable to tune more than one instrument at a time in the same room, a crystal pick-up type device may be employed with each instrument being tuned, in place of a microphone. A crystal pick-up type transducer device eliminates noise interference from other instruments under test in the same room since the noise vibrations are taken directly from the vibrating element of the instrument being tuned.

Continuing with the description with reference to FIGURE 1, the transducer 12 converts the received acoustical signal into an electrical output signal having the form of a sine wave. The frequency of the output sine wave is exactly the same as that of the initial acoustical signal. The output sine wave of the transducer is then fed into a signal conditioning circuit 14. Circuit 14 may include an amplifier, and pulse shaper such as a Schmitt trigger circuit with a threshold control generally designated 16. The output signal of circuit 14 being a pulse train is imposed upon an "and" gate logic 18. The gate 18 is held open by a control gate signal from a driver circuit 20.

The counter 22 may be any suitable counter such as a conventional $2^n$ binary counter. Other counters such as the ring of ten decade counter may be preferable. As the pulses pass through gate 18, they are received by a digital counter 22 and the total count display on a suitable visual display 24. The number of pulses recorded by the counter 22 may be displayed by the visual display 24 for any predetermined time such as fraction of a second or several seconds, which may be determined by a preselected time setting of a reset generator included in driver circuit 20.

Referring again to FIGURE 1, a time base 26 is utilized to provide a reference standard for generating the pulses employed to open and close gate 18 at preselected time intervals. In this illustrative embodiment, the time interval during which the gate 18 is held open has been chosen as one second. Any convenient time may be chosen. For simplicity, in the present case one second was chosen because this gives a direct readout of the counter in cycles per second and corresponds to time base of a 60 cycle which may be used as the reference standard. Thus, during the one second time interval, 60 pulses are fed through gate 30 and in turn to an electronic counter 32 which in turn produces a control signal for gate 18. Other more elaborate reference standards may be utilized, for example a precision crystal oscillator may be employed.

The signal from the reference standard or time base 26 is fed to a second conditioning circuit 28 similar to circuit 14. The output signal from circuit 28 is a train of pulses corresponding to one pulse per cycle of the frequency of the standard. The resulting pulse train is fed to a count gate 30 which is a component circuit of the driver circuit 20.

The pulse train output from gate 30 is fed to an electronic counter 32. Electronic counter 32 may be a series of flip-flop circuits with capacity enough to accommodate the counting cycle. This counter has two output channels 34 and 36. Channel 34 is energized initially and supplies the control signal to gate 18 after passing through a first flip-flop circuit 40. After 60 cycles, corresponding to one second, the second channel 36 is energized. A portion of the signal goes to circuit 40, cutting off the energy to gate 18, thus stopping the count. Another portion of the signal goes to a reset generator 42. The reset generator 42 includes a reset time control element 44. The primary function of the reset generator is to provide a device by which the operator may vary the length of time for each reading period and starting the counting cycle. A preselected setting of element 44 will determine the length of time the count will be held by digital counter 22 and displayed by display 24. Still another portion of the signal 36 is fed to a time delay circuit 46, which will be discussed hereinbelow in greater detail in connecttion with another embodiment of the invention. Yet another portion of signal 36 is fed to a second flip-flop circuit 38. In its initial state it permits the signal from the signal conditioning circuit 28 to pass through gate 30. Its other function is to close gate 30 in response to the second signal 36 from counter 32 and open the gate again in response to the delayed signal from the reset generator 42.

It should be noted at this point that the circuitry of the present invention may be transistorized. For example, with reference to FIGURE 1, the first signal conditioning circuit 14, gate 18, digital counter 22, second signal conditioning circuit 28, gate 30, counter 32, flip-flop circuits 42 and 48, reset generator circuit 42 and time delay circuit 46 may be transistorized. Thus the apparatus may be made light in weight and small in size. In the present specification and claims the term transistorized is used and as used is intended to mean the use of all types of semi-conductor devices where appropriate.

Consider now the advantages which are provided by the novel electronic tuning apparatus of the invention. Owing to the unique direct read-out feature of the apparatus, such as a numerical figure presented by the visual display 24, the apparatus provides an unusually accurate aid to one tuning a musical instrument such as a piano or making other frequency measurement of acoustical energy devices. No known apparatus heretofore available has had this feature. Furthermore, the simplicity and ease of operation of the apparatus enables one unfamiliar with electronic equipment and music to tune a musical instrument, such as the piano, with precision accuracy while requiring a minimum amount of time and effort for tuning. Finally, the transistorized circuity enables the apparatus to be produced as a small size portable equipment requiring less power than heretofore available devices.

Referring now to FIGURE 2, there is shown another embodiment of the invention illustrating one form of automatic electronic apparatus for tuning a plurality of acoustical sources, such as the pipes of an organ. More particularly, there is shown a plurality of organ pipes 58 for tuning and which transmits acoustical energy to transducer 12. Also shown is signal conditioning circuit 14 and threshold element 16, gate 18, driver circuit 20, counter 22, second signal conditioning circuit 28, time base 26 and time delay circuit 46. In addition there is shown a programmer system 48 which functions as the control center for the entire automatic system. Connected thereto is a reference system 50 which for this illustrative embodiment may include a series of cams and a drum driven by an associated motor, none of which have been shown. A typical motor-driven drum and cam structural arrangement or system which may be utilized for this embodiment is illustrated in "Control of Electric Motors," by Paisley B. Harwood, second edition, John Wiley and Sons, at page 328. The cams are connected to the drum to provide the presetting of a plurality of switches to establish a reference pattern for the digital count to be compared with the pulse count fed to the first counter 22. The reference system is in turn connected to a comparator system 52 which is in turn connected to a motor selector system 54 and motor system 56 which includes a plurality of motors corresponding to the number of acoustical sources to be tuned. The comparator is also connected to the counter 22, time delay circuit 46 and a relay driver circuit 60. The manner in which the counter 22, comparator 52, motor selector 54 and motors 56 cooperate is shown in detail in FIGURE 3 as a schematic drawing.

Referring now to FIG. 3, there is shown a schematic diagram illustrating the manner in which portions of the circuitry shown in FIGURE 2 cooperate to provide automatic tuning of a plurality of acoustical energy sources. This circuitry represents portions of the counter 22, comparator 52, motor selector system 54, bi-directional stepper motor system 56, time delay circuit 46 and a relay driving potential 60 in combination to provide automatic tuning of the organ pipes 58 shown as a block diagram in FIGURE 2. As discussed briefly hereinabove with reference to FIGURE 2, the programmer circuit 48 energizes a motor associated with reference system 50 which rotates an associated drum and a plurality of associated cams connected thereto, which arranges a plurality of associated switches 62 and 64 to a setting which represents low and high frequency limits on either side of the exact frequency of the organ pipe selected to be tuned.

The comparator 52 has a series of logic gates 66 and 68 respectively corresponding to the low and high frequency limits set by the switches 62 and 64. The relay driver 60 provides a direct current driving potential to gates 66 and 68, which passes there through whenever the count of the flip-flop circuits of the counter 22 compare with the setting of the switches 62 for the low limit and 64 for the high limit. In series with each string of gates 66 and 68 there is a relay driver 70 and 72 respectively which are in turn each connected to relay coils 74 and 76 respectively.

Whenever a signal energizes the relay coil 74, it activates a switch 78 that in turn activates a switch 80 which sends a "Go" signal to the programmer 48. The "Go" signal indicates that a satisfactory comparison of the reference standard and the frequency measured by counter 22 has occurred. On the other hand when the relay 76 is energized, a switch 82 is actuated which in turn actuates a switch 84 and finally the bidirectional stepper motor 56. If the relay driver 70 fails to receive a signal through the series of gates 66, switch 80 remains in the position shown at point 86 and a signal is fed to the motor 56 which represents the motor of the organ pipe being tuned. The time delay circuit 46 imposes a preselected time delay, such as one second, on the motor selector system. The purpose of this time delay is to insure that comparator 52 has had enough time to complete its comparison between the frequency measured and the setting of the reference.

A typical operating cycle for the embodiment shown in FIGURE 2 is started by pushing a start button 90 which energizes programmer system 48. It should be noted at this point that a suitable power supply in utilized to provide power to each of the circuits employed in the invention, however, none has been shown. Continuing with the discussion of the operation of the apparatus, programmer 48 energizes the organ pipes 58 with air from the air blowers associated with the organ pipe, which has not been shown. The particular organ pipe to be tuned is selected and the reference system 50 is energized thereby arranging the series of switches 62 and 64. A preselected pattern is chosen which corresponds to a predetermined count above and below the exact frequency to which the pipe select should be tuned. The difference in count between the upper and lower limit will depend upon the degree of accuracy required in tuning.

After the reference system 50 has arranged the switches 62 and 64 to correspond to the desired frequency limits, the programmer 48 energizes the specific organ pipe under test. The acoustical energy from the energized pipe is transmitted to the transducer 12, whereupon the number of pulses generated are counted and recorded momentarily by counter 22 in substantially the same manner as described hereinabove in connection with FIGURE 1. The count recorded by counter 22 is compared with the frequency setting of switches 62 and 64 for a "Go," "no go low" or "no go high" signal.

For example, if the count of counter 22 is lower than the lower limit set by the reference system 50, no signal will pass through all of the gates designated 66 to energize relay driver 70. Thus, switch 80 will remain at point 86 and a "no go low" signal is fed to the motor 56 representing the stepper motor of the pipe under test. The particular organ pipe is automatically adjusted by the stepper motor to raise the frequency of the organ pipe when the next frequency reading is taken. The organ pipe is again excited, the frequency measured and recorded by counter 22. The recorded frequency count is again compared with the limits of the frequency presetting of switches 62 and 64. Assuming that the count is higher than the higher reference limit, a signal will pass through all of the gates designated 68 and relay coil 76 will be energized through relay driver 72. The signal from relay driver 72 in turn actuates switch 82 and 84, flipping the arm of switch 84 to point 88, thereby producing a "no go high" signal. This "no go high" signal is fed to the motor of the organ pipe which automatically adjust the frequency thereof for a lower frequency.

Repeating the tuning cycle again, and assuming a count above the lower limit but below the high limit, a signal would reach the relay driver 70 through the appropriate gates 66. This would throw the switch 80 to the position 92, thereby producing a "Go" signal. Thus, the "Go" signal is fed to the programmer and the next pipe in the programmer pattern is selected. A cycle similar to the foregoing is repeated over and over again until tuning of the organ pipes is completed.

Consider now the advantages of the automatic tuning arrangement shown in FIGURES 2 and 3. From a time saving point of view, the present invention provides an arrangement which will reduce greatly the time required for tuning a plurality of acoustical energy sources, such as the organ pipe. More particularly, each organ pipe may be provided with an inexpensive stepper motor for raising or lowering the frequency of each organ pipe. Since the cost of motor installation is a one time event, the cost is relatively small when compared with labor costs presently associated with the existing manual methods for tuning organ pipes and other similar acoustical energy sources. Moreover, such devices manually require the operator to be experienced in tuning such devices and to be familar with the equipment employed for tuning.

Still another important advantage arises from the fact that the present invention provides an extremely accurate arrangement for tuning. More particularly, the difference between the upper and lower frequency limits may be only a few cycles. Thus, the guess work is eliminated so that the measurement is relatively a precise one.

Finally, the present invention provides two arrangements wherein semi-conductor devices may be readily adapted to use. It will be appreciated that the size, weight, power requirement and reliability are features which may be included in the present invention with the use of semi-conductor devices. The simplicity of the circuitry employed by the present invention permits the use of readily available semi-conductor components and parts.

While the electronic frequency measuring apparatus of the invention has been described with reference to several particular embodiments, it will be understood that various modifications could be made in the construction thereof without departing from the spirit and scope of the invention. Accordingly, it is expressly understood that the foregoing description shall be interpreted only as illustrative of the invention and that the claims be accorded as broad an interpretation as is consistent with the basic concepts herein taught.

What is claimed as new is:

1. Apparatus for automatically measuring and adjusting the frequency of each of a plurality of acoustical energy sources comprising: a transducer for detecting the acoustical energy generated by each of a plurality of acoustical sources to be measured one at a time and for converting said detected energy into an electrical sine wave signal, having a frequency equal to the frequency of said acoustical energy; means including circuitry for amplifying and shaping said sine wave generated by said transducer into a pulse train, said pulse train having pulses corresponding in number to the positive peaks of said sine wave; means including a gate logic for passing said pulse train from said pulse amplifying and shaping means in response to a control signal applied to said gate logic; means including a first counter connected to said gate logic for counting the number of pulses passed by said gate logic and electrically recording said number of pulses counted; means including a control circuit for applying said control signal to and for removing said control signal from said gate logic at pre-selected time intervals, said control circuit including an electronic counter and circuit means connected to said gate logic and said first counter for passing said control signal imposed upon said gate logic, and for passing a signal to said first counter for resetting it for successive counting cycles; means including a programmer system connected to said plurality of acoustical energy sources for electrically energizing said acoustical energy sources, and for selecting successively each of said plurality of sources to be measured and energizing a reference system connected to said programmer system to establish frequency limits for comparing the frequency of oscillations counted by said first coutner; means connected to said reference system for comparing the frequency measured by said first counter with said frequency limits established by said reference system; and means connected to said programmer system, said comparison means and said plurality of acoustical energy sources for automatically adjusting the frequency of each of said acoustical sources to within said frequency limits.

2. The apparatus defined in claim 1 wherein said reference system includes a plurality of cams in a preselected arrangement with respect to one another on a rotatable drum for setting a plurality of associated switches to establish upper and lower frequency limits for comparing said frequency of oscillations counted by said first counter.

3. The apparatus defined in claim 2 wherein said means for comparing the frequency measured by said first counter includes a plurality of logic gates corresponding in number to the number of said switches for establishing the upper and lower frequency limits for comparing said frequency of oscillations counted by said first counter.

4. The apparatus defined in claim 3 wherein said means for automatically adjusting the frequency of each of said acoustical sources includes a bi-directional stepper motor for each of said plurality of acoustical sources for changing the frequency of said acoustical source corresponding to each of said stepper motors; and circuit means for activating said motors to adjust the frequency of said source to a frequency within the frequency limits established by said reference system.

5. An apparatus for measuring and adjusting the oscillation frequency of an acoustical energy source comprising: means for detecting the frequency of oscillation generated by an acoustical source under measurement; means including a digital counter connected to said detecting means for counting the oscillation frequency generated by said acoustical energy source; a comparator system having a series of gate logic circuits and corresponding switches for setting an oscillation frequency range the center of which corresponds to the frequency generated by said acoustical energy source as adjusted, said comparator system being connected to said digital counter and a motor selector system for comparing said frequency of oscillation counted by said counter with the frequency range of said comparator; and a programmer system connected to said motor system and said comparator system by a reference system for adjusting and exciting of said acoustical energy source under measurement so that said frequency of oscillation generated by said energy source under measurement comes within said frequency range.

6. Apparatus for automatically tuning a plurality of acoustical devices successively comprising: means including a transducer for picking up the frequency of oscillations of acoustical energy generated by each of a plurality of acoustical devices when energized; circuit means connected to said transducer by a series connected signal conditioning circuit and a gate logic circuit for counting the frequency of oscillations picked up by said transducer; means including a reference system, a motor selector system, and a motor system connected to said plurality of acoustical devices for selecting frequency limits for comparison with the frequency of oscillations counted by said circuit means; and means connected to said circuit means and said motor system for automatically comparing the frequency of oscillations counted by said circuit means with said frequency limits and for adjusting the frequency of said acoustical devices to within said frequency limits.

7. An apparatus for measuring and adjusting the individual resonance frequency of a plurality of organ pipes as each is excited to produce an acoustical energy signal comprising: detecting means for receiving the oscillation frequency signal generated by an organ pipe when excited which corresponds to the resonance frequency; means connected to said detecting means for converting said oscillation frequency signal to a series of pulses corresponding to said oscillation frequency of said organ pipe and for counting said pulses after they pass through a gate logic in response to a control signal applied to said gate logic; means including a signal source connected to said gate logic and said counting means through a series connected pulse forming circuit and a driver circuit for applying said control signal to said gate logic and a reset signal to said counting means; a comparator system connected to said counting means, a reference system and a motor selector system for comparing pulses received by said counting means with a preselected pulse count setting of said comparator system established by said reference system and said motor selector system, said pulse count setting having a range whose limits are above and below the resonance frequency of said organ pipe under measurement; and a programmer system connected to said reference system, said motor selector system and said plurality of organ pipes, said programmer functioning as a control center of the apparatus for adjusting the frequency thereof and for energizing the individual organ pipes during their measurement.

8. An apparatus for measuring and adjusting the individual resonance frequency of a plurality of organ pipes as each is excited to produce an acoustical energy signal comprising: detecting means for receiving the oscillation frequency signal generated by an organ pipe when excited which corresponds to the resonance frequency; means connected to said detecting means for converting said oscillation frequency signal to a series of pulses corresponding to said oscillation frequency of said organ pipe and for holding a gate logic open in response to said series of pulses; means including a signal source connected to said gate logic and said counting means through a series connected pulse forming circuit and a driver circuit for applying a plurality of pulses to said gate logic to be counted and a reset signal to said counting means; a comparator system connected to said counting means, a reference system and a motor selector system for comparing pulses received by said counting means with a preselected pulse count setting of said comparator system established by said reference system and said motor selector system, said pulse count setting having a range whose limits are above and below the resonance frequency of said organ pipe under measurement; and a programmer system connected to said reference system, said motor selector system and said plurality of organ pipes, said programmer functioning as a control center of the apparatus for adjusting the frequency thereof and for energizing the individual organ pipes during their measurement.

9. An apparatus for measuring and adjusting the oscillation frequency of acoustical energy sources comprising: means for detecting the frequency of oscillation generated by each of a plurality of acoustical energy sources under measurement; means including a series connected digital counter and a gate logic connected to said detecting means for determining the oscillation frequency generated by said acoustical source under measurement, said acoustical source generating a control signal for said gate logic of a predetermined duration; a pulse signal source connected to said logic gate and said digital counter for generating pulses counted by said digital counter; a comparator system having a series of logic gate circuits and corresponding switches for setting an oscillation frequency range the center of which corresponds to the frequency generated by said acoustical energy source as adjusted, said comparator system being connected to said digital counter and a motor selector system for comparing said frequency of oscillation counted by said counter with the frequency range of said comparator; and a programmer system connected to said motor system and said comparator system by a reference system for adjusting and exciting of said acoustical energy source under measurement so that said frequency of oscillation generated by said energy source under measurement comes within said frequency range.

References Cited in the file of this patent

UNITED STATES PATENTS

| | | |
|---|---|---|
| 2,505,164 | Weathers et al. | Apr. 25, 1950 |
| 2,901,699 | Motz et al. | Aug. 25, 1959 |
| 2,909,727 | Andersen | Oct. 20, 1959 |
| 2,958,250 | Poehler | Nov. 1, 1960 |
| 2,987,674 | Shain | June 6, 1961 |
| 2,988,695 | Leavitt | June 13, 1961 |
| 2,991,415 | Pierson | July 4, 1961 |
| 2,992,384 | Malbrain | July 11, 1961 |
| 3,039,685 | Bagley et al. | June 19, 1962 |
| 3,064,189 | Erikson et al. | Nov. 13, 1962 |